United States Patent

[11] 3,607,505

| [72] | Inventor | Henry G. Schirmer |
| --- | --- | --- |
| | | Spartanburg, S.C. |
| [21] | Appl. No. | 659,940 |
| [22] | Filed | Aug. 11, 1967 |
| [45] | Patented | Sept. 21, 1971 |
| [73] | Assignee | W.R. Grace & Co. |
| | | Duncan, S.C. |

[54] METHOD OF PRODUCING A LAMINATED TUBULAR ARTICLE
9 Claims, 8 Drawing Figs.

[52] U.S. Cl. .................................................. 156/156,
156/229, 156/244, 156/285, 264/176, 156/309,
156/306, 156/278, 117/7, 117/94
[51] Int. Cl. .................................................. B29c 17/00
[50] Field of Search .................................................. 156/229,
244, 156, 285, 309, 278; 264/176; 117/7, 94,
105.3, 118

[56] References Cited
UNITED STATES PATENTS

| 3,194,273 | 7/1965 | De Laubarede .............. | 156/229 X |
| --- | --- | --- | --- |
| 3,249,666 | 5/1966 | French .......................... | 156/244 X |
| 3,312,766 | 4/1967 | Stevens ......................... | 156/244 UX |
| 3,371,002 | 2/1968 | Reddeman .................... | 156/244 |
| 3,380,868 | 4/1968 | Moser ........................... | 156/229 |
| 3,392,076 | 7/1968 | Vander Pals .................. | 156/244 |
| 3,397,101 | 8/1968 | Rausing ........................ | 156/229 |
| 3,418,396 | 12/1968 | Edwards et al. ............. | 156/244 |

*Primary Examiner*—Benjamin R. Padgett
*Assistant Examiner*—Stephen J. Lechert, Jr.
*Attorneys*—John J. Toney, William D. Lee, Jr. and Edward J. Hanson, Jr.

ABSTRACT: A laminated, tubular, thermoplastic film having high tensile strength, shrink energy, and tear resistance is produced by continuously extruding a layer of a first thermoplastic material onto a tubular substrate of a second thermoplastic material and then cooling, heating, and stretch-orienting the resulting laminate. By repeating the process, multiplelayer laminates may be produced.

METHOD OF PRODUCING A LAMINATED TUBULAR ARTICLE

This invention relates to extrusion coated or laminated oriented, heat-shrinkable thermoplastic films and the method for continuously producing same.

The use of heat-shrinkable thermoplastic films in many packaging applications is well established. Usually a product is overwrapped with film, sealed, and then heat is applied thus shrinking the film snugly about the product. One of the most useful and satisfactory thermoplastic materials for packaging film has proven to be polyethylene. A number of methods are available in the prior art to convert raw polyethylene into a suitable, heat-shrinkable packaging film. One method is taught by U.S. Pat. No. 2,855,517 issued to W.C. Rainer et al. on Oct. 7, 1958. Another method is taught by U.S. PAT. NO. 3,022,543 issued to W. G. Baird, Jr. et al. on Feb. 27, 1962. In the Baird method, polyethylene is continuously extruded in the form of a tube, drawn, irradiated with electrons at a dosage between $2\times10^6$ and $20\times10^6$ REP, heated, and stretched again by applying internal pressure to the tubing. The resulting film usually has good heat-shrinking properties but has a low tear strength. Once a tear has begun it is rapidly propagated during the heat shrinking process causing destruction of the film, Therefore, it is an object of this invention to provide a heat shrinkable film with improved tear strength at room temperature as well as at shrinking temperature.

Another object is to provide a film which will shrink at relatively low temperatures.

Another object is to provide a laminated, tubular film which can readily be made into pouches and bags.

Yet another object of the invention is to provide a heat shrinkable thermoplastic film having improved heat-sealing properties.

Still another object is to provide a film having higher gloss.

A further object is to provide a film which is easier to handle, stack, and use when made into pouches and bags.

These and other objects are achieved by the present invention which provides a laminated thermoplastic film having an initially unoriented tubular thermoplastic substrate that is oriented subsequent to the lamination or coating. The substrate is laminated with a thermoplastic polymer, cooled, reheated, and oriented. The resulting laminated film has considerably higher tear resistance than an oriented film alone; and, in addition, retains high-shrink tension and free-shrinking ability.

The novel method for producing the laminated film comprises the steps of providing cross-linked and unoriented thermoplastic tubing, extruding a thermoplastic coating onto the tubing without stretching or orienting same, cooling the resulting laminated tubing, reheating the laminated tubing to a temperature below, at, or above the melting point of the coating and then stretch-orienting the composite tubing.

For simplicity the discussion herein will employ an irradiated polyethylene as the preferred substrate and a copolymer of ethylene and vinyl acetate as the preferred coating although it will be readily understood by those skilled in the art that other materials may be used as hereinafter described. The invention may be better understood by reference to the following detailed description and drawings in which.

Figure 1:
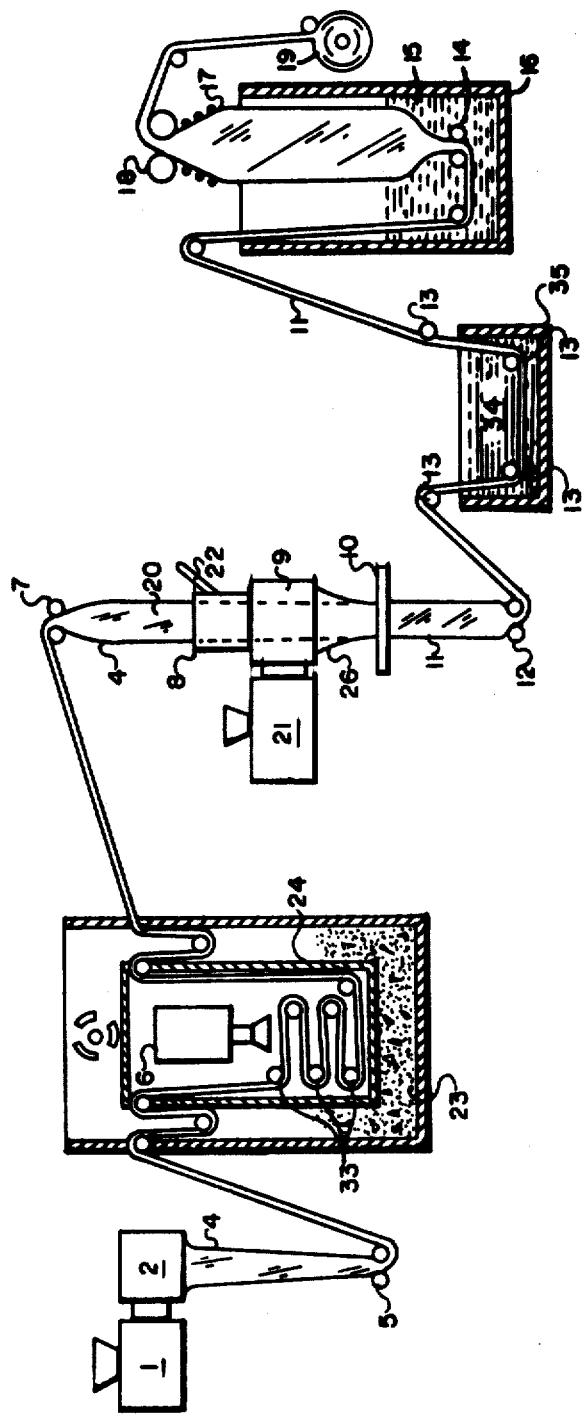
FIG. 1 is a schematic diagram of a preferred method for carrying out the invention.

Referring to FIG. 1, a conventional extruder 1 is shown into which is fed polyethylene, e.g., a 3½-inch electrically heated extruder may be used. The tubing 4 is extruded downwardly from die head 2 which is fed from extruder 1. After cooling the tubing is collapsed by pinch rollers 5 and is fed through an irradiation vault 24 surrounded by shielding 23 where it is irradiated with electrons from an iron core transformer accelerator 6. Other accelerators such as Vander Graff or resonating transformer may be used. The radiation is not limited to electrons from an accelerator since any ionizing radiation may be used. The unit of radiation employed herein is the RAD which is defined as that amount of radiation which will dissipate 100 ergs of energy per gram of irradiated material by ionizing particles. The MR is one million ($10^6$) RAD.

The time of irradiation of the polyethylene tubing 4 is not critical but need only be enough to give the required dosage to effect cross-linking. In the present embodiment the radiation dosage should be in the range of 2 to 16 MR and preferably about 6 to 8 MR. In the prior art it is usually desirable to irradiate to about 12 MR. At the lower dosages usable with the present invention the irradiation efficiency per pound of tubing is greatly increased. Any suitable cross-linking techniques may be used such as chemical cross-linking and irradiation but the discussion will be simplified by referring primarily to irradiation as the means to achieve cross-linking.

The tubing 4 is guided through the irradiation vault 24 by rollers 33; and, after irradiation, the tubing 4 goes through pinch rollers 7 following which it is slightly inflated by a trapped bubble 20 but not stretched longitudinally as the rollers 7 are driven at the same speed as rollers 5. The tubing is inflated only enough to provide a substantially circular tubing without significant transverse orientation. The slightly inflated tubing 4 passes through vacuum chamber 8 and through a laminating die 9 where the thermoplastic coating 26 is extruded onto the inflated tubing 4 thus forming laminate 11. The die 9 is fed molten thermoplastic from a conventional extruder 21. In a preferred embodiment the coating is ethylene vinyl acetate copolymer having 9½percent vinyl acetate by weight. Ethylene vinyl acetate copolymers having a vinyl acetate content in the range between 3 percent and 28 percent by weight are preferred thermoplastic coatings.

Figure 6:
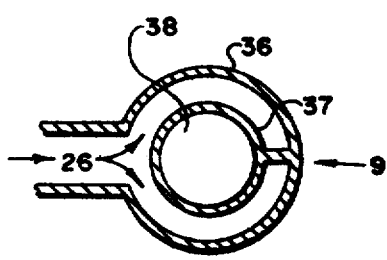
FIG. 6 is a view taken along line 6—6 of FIG. 5.
Figure 5:
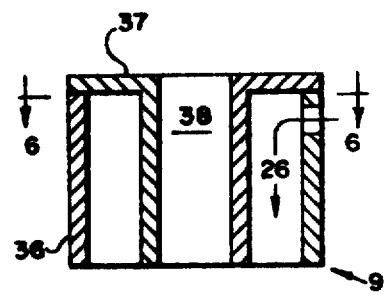
FIG. 5 is a cross section of the die heat used in the present invention.

The extruder 21 is conventional, e.g., a standard 2½-inch extruder. The die 9 is an unconventional crosshead die which is so machined as to provide a 3½-inch opening for the slightly inflated tubing 4. The details of the die 9 may be better appreciated by referring to FIGS. 5 and 6. The opening 38 through which the inflated substrate passes has been cut through mandrel 37 which is attached to the die housing 36. The path of the molten coating material 26 is indicated by the arrows in FIGS. 5 and 6.

The vacuum chamber 8 puts a mild vacuum, e.g., in the range from 0 to about 3 inches of water, on the die 9 to draw or "suck" in the extruded coating 26 while it is still molten against the inflated tubing 4 to prevent the formation of occluded bubbles in the laminate 11. The vacuum chamber 8 can simply consist of a cylindrical housing whose inner diameter closely conforms to the outer diameter of the inflated tubing. The vacuum can be applied through outlet 22 by a conventional vacuum hose.

The molten ethylene vinyl acetate copolymer 26 is extruded directly onto the polyethylene tubing with the temperature of the die 9 at about 420° F., and then cooled by the water spray from cooling ring 10. Pinch rollers 12 collapse the now formed laminate 11.

In the example for the preferred embodiment the wall thickness of the polyethylene tubing prior to orienting would be about 16 mils and the thickness of the coating is about the same so that the thickness of the laminate 11 prior to orienting would be about 32 mils. The laminate 11 as it passes through the pinch rollers 12 and over guide rollers 13 is thus unstretched and unoriented.

A preheat tank 35 containing water 34 at about 212° F. begins the heating process for laminate 11. As the period of time the laminate 11 spends in tank 35 is not long the total laminate temperature does not reach the water temperature.

The laminate 11 is continually heated in hot water bath 15 to a temperature at or below the melting point of the substrate and then is srretch-oriented by the blown-bubble technique. In the present example the temperature of the bath 15 is 205° F. and the bubble 17 effects a 4:1 stretch in both the transverse and longitudinal directions thus reducing the thickness of the laminate 11 to about 2 mils thickness. The coating and the substrate are reduced equally. The bubble 17 is finally collapsed by rollers 18 and the laminate is rolled onto windup roll 19.

When the ethylene vinyl acetate copolymer with about 9½ percent vinyl acetate is raised to a temperature of 212° F., it is slightly above its crystalline melting point. The crystalline freeze point is approximately 172° F. It is well known that crystalline materials have a crystalline melt point and a crystalline freeze point which differ. This phenomenon is termed a "hysteresis" effect. The blowing causes the melted ethylene vinyl acetate copolymer layers to flow and become hot blown and thus substantially unoriented while the irradiated or cross-linked polyethylene layer becomes highly oriented. The resistance to tearing exhibited by the laminate is due primarily to the fact that the copolymer was melted at the usual orientation conditions of irradiated polyethylene and became hot-blown rather than oriented.

A comparison of the properties of conventional irradiated and oriented film with two laminated films of the present invention are given in the table below:

LAMINATES

|  | Irradiated, oriented polyethylene substrate | | Conventional irradiated, oriented polyethylene |
|---|---|---|---|
|  | E/VA coat 9½% VA* | E/VA coat 17% VA* |  |
| Average total film thickness (mils) | 2.0–2.9 | 1.2–2.1 | 2.0–2.5 |
| Tensile strength (p.s.i.) | 7,718 | 8,763 | 7–10,000 |
| Elongation (percent) | 93.8 | 72.7 | 50–100 |
| Modulus at 73 F. (p.s.i.) | 17,100 | 20,675 | 25–30,000 |
| Tear strength (grams/mil) | 8 | 103 | 3–4 |
| Impact strength (grams) | 664 | 720 | 400–500 |
| Free shrink (percent): |  |  |  |
| 210° F | 58 | 52 | 50 |
| 190° F | 24 | 30 | 29 |
| Shrink tension (p.s.i.): |  |  |  |
| 210° F | 250 | 270 | 315 |
| 190° F | 210 | 210 | 285 |

*Ethylene/vinyl acetate, 9½ or 17 weight percent vinyl acetate.

From the above it can be seen that the tensile strength and shrink tension of the laminates is within the same range as that of the conventional film, but the tear propogation strength is significantly increase. The tear strength of conventional polyethylene is usually not greater than 6 gms./mil but the laminates are appreciably above this value. The increase in tear strength is most noticeable with the 17 percent vinyl acetate copolymer laminate and it appears that the tear strength increases with the proportion of vinyl acetate in the ethylene vinyl acetate copolymer. Tear strengths given herein are measured in accordance with the ASTM procedures for paper.

Figure 2:
FIG. 2 is a cross-sectional view of the laminated film of the present invention.
Figure 3:
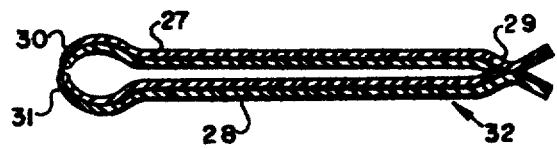
FIG. 3 is a cross-sectional view of an improved bag made from the laminated tubing showing the curl produced at the bag opening.

In FIG. 2 a cross section of the laminate 11 is illustrated showing substrate 4 and coating 26. FIG. 3 shows a cross section through a bag 32 which can be made from the laminated tubing 11. The tubing can be transversely cut and heat-sealed resulting in a seal 29 which closes off one end of the tubular segment. The other end is left open to receive a product such as a turkey, beef round, etc. It is this open end to which attention is now drawn. The lips or edges 30 and 31 of the bag curl inward instead of lying flat as they would in the case of a non-laminated thermoplastic bag. Since the substrate or inside layer of the bag is stressed more than the coating or outer layer, there is a curl inward.

Figure 4:
FIG. 4 is a schematic representation of the bag of FIG. 3.

The inward curl of the bag lips has the advantage of making the bags easier to open. On production lines where bags are opened manually and the product inserted therein even a short delay encountered in opening a bag is costly. Bags made from nonlaminated film have lips which lie flat and tend to adhere to each other. The curled lip on the bags made from film according to the present invention enables a worker to more easily separate the bag lips and open the bag, thus increasing production. FIG. 4 further illustrates a bag or pouch made from the tubular laminate.

If it should be desirable to print or color the laminate 11, it can be advantageously accomplished by printing or applying coloring pigment to the substrate 4 in FIG. 1 either before or after passing through the irradiation vault and accelerator 6, but before extrusion coating 26 is applied. Printing or coloring the substrate before coating and then subsequently applying the coating gives a protective coating that prevents the pigment from wearing or scraping off. More importantly, two layers of film may be used to create a mirror effect where one is clear and the other is opaque resulting in a glossier and more attractive package. In the preferred embodiment this effect is achieved as the polyethylene is relatively opaque and the ethylene vinylacetate copolymer coating is clear.

Obviously, if nontubular or sheet film is desired the tubular film can be longitudinally slit or cut thus producing continuous sheet film.

Heat seals, such as the heat seal 29 in FIG. 3, are improved because of the lower irradiation dosage given the substrate which normally will serve as the sealing surface in a packaging application of the present invention. Still another advantage of the laminate is that it can be made to heat-shrink at lower temperatures than the oriented, irradiated polyethylene film.

The higher tear resistance of the laminated film can be demonstrated by the pinhole test for tear resistance at shrinking temperature. The film to be tested is restrained smooth and wrinkle-free over the end of a 1 inches diameter stainless steel tube. The film is not stretched. The restrained film is punctured with a needle and immersed to a depth of one inch in a bath of water or carbowax heated to about 85° C. The time it takes the pinhole to propagate into a tear is a measure of the film's resistance to tear against the shrink forces which exist at the elevated temperature. The process is repeated at successively higher temperatures. Comparative results of the test are as follows:

TIME

| Temp. | Polyethylene Irradiated, oriented | Laminate Polyethylene E-va¹ |
|---|---|---|
| 85° C | 14.1 sec. | 56.3 sec. |
| 90° C | 3.9 | 30.0 |
| 90.95° C | 1.5 | 7.7 |
| 100° C | 0.3 | 2.4 |

This increase in tear resistance appears to be due to a webbing effect wherein the unoriented coating tends to elongate and separate from the substrate when the laminate is torn. Thus in a tear, the substrate will be separated at the point of tearing but the coating will be stretched or webbed across the tear.

Figure 7:
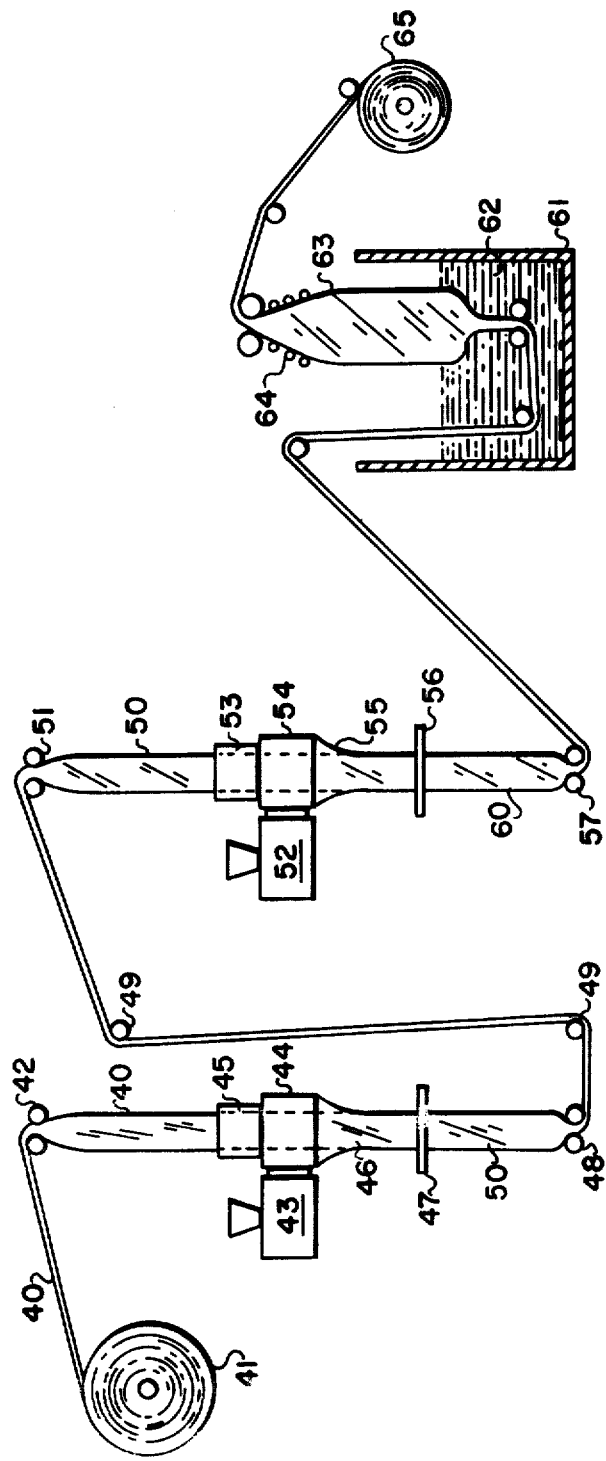
FIG. 7 is a schematic diagram showing a preferred method of producing a multiple-layer laminate; and, FIG. 8 is a multiple-layer laminate produced according to the invention.

Laminates having more than two plies can be produced according to the present invention. In FIG. 7 a schematic process is shown with the substrate 40 being unwound from feed roll 41 and transferred through pinch rollers 42 after which it is inflated for the pass through the first die 44. Extruder 43 forces the molten extrudate or coating 46 out through the die 44 where it is coated onto the substrate 40 which now becomes two-ply laminate 50. Cooling ring 47 cools the laminate and pinch rollers 48 deflate the laminate 50. The laminate 50 could remain inflated, but for transfer purposes it is more convenient to collapse it and transfer it on rollers 49.

The process is repeated as the two-ply laminate 50 is inflated and passed through die 54 where it becomes three-ply laminate 60 as coating 55 is applied. Cooling ring 56 and heating bath 62 serve the same function as before. The laminate is blown into bubble 63 for orientation and for thickness reduction and then collapsed by rollers 64 and sent to windup roll 65.

It will be evident to those skilled in the art that the above process could be repeated and as many plies as desire can be applied in building up a laminate.

Figure 8:
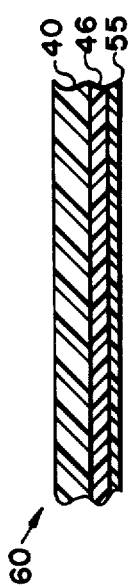

A preferred substrate 40 for a three-ply laminate is an unoriented, irradiated polyethylene; and, a preferred first coating 46 is ethylene vinyl acetate copolymer having 9½ percent vinyl acetate. A hard, scratch resistant coating for the outer ply or coating 55 is a polyamide. Before stretching the laminate, typical thicknesses for each coating would be 15 mils for the polyethylene, 13 mils for the ethylene vinyl acetate copolymer, and 0.5 mil for the polyamide. After stretching, approximate thicknesses would be 1.0 mil for the polyethylene, 0.87 mil for the ethylene vinyl acetate copolymer and 0.033 mil for the polyamide. In FIG. 8, a cross section of the three-ply laminate 60 is shown.

As stated previously, the polyamide coatings are hard and scratch resistant but polyamides are relatively expensive, however, the use of polyamides can be made be a be economical by employing thin coatings. Since the polyamide has a melting point of about 400–550° F., the coating 55 (FIG. 7) must be rapidly quenched by cool water from ring 56 to prevent crystallization. Thus, the polyamide coating will be hot-blown with the ethylene vinyl acetate copolymer while the polyethylene is stretch oriented.

The present invention is not limited to the specific materials used in the preferred embodiments described above. The only limitation is that the coating be a plastic material capable of being drawn or stretched at the orientation temperature of the substrate.

Other polymers of monolefins, e.g., polypropylene, and polyvinyl chloride would be a quite suitable substrate material; and desirable coatings include but are not limited to polymers of vinyl chloride, urethane, amides, vinylidene chloride, and the like. The term polymer is understood to include copolymers, homopolymers terpolymers, and graft or block polymers.

I claim:

1. In a process for producing laminated, oriented film from thermoplastic materials by extruding a hot coating layer onto a premanufactured substrate layer, the improvement of producing the film in oriented, tubular form which comprises the steps of:
   a. providing an inflated, but not stretched, tubular substrate, said substrate material having an orientation temperature higher than the crystalline freezing point of the coating material;
   b. providing a circular extrusion die;
   c. passing said inflated substrate through said die; and, consequently,
   d. extrusion coating the outside of said substrate material with a molten thermoplastic material thereby producing a laminate, said coating material being capable of being stretched, but not oriented, at the orientation temperature of the substrate material;
   e. cooling said laminate;
   f. passing the laminate through pinch rollers;
   g. heating the laminate to the orientation temperature of the substrate;
   h. inflating the heated laminate thereby stretching and orienting the substrate while stretching but not orienting the coating.

2. The process of claim 1 including the step of applying a vacuum to the circular extrusion die to remove entrapped air between the coating and the substrate.

3. The method of claim 1 wherein the substrate material is polyethylene.

4. The process of claim 1 wherein the substrate material is cross-linked polyethylene.

5. The process of claim 4 wherein the coating material is an ethylene vinyl acetate copolymer having between 3 percent and 28 percent vinyl acetate content by weight.

6. The method of claim 5 wherein the laminate is heated to approximately 212° F. for orientation of the substrate.

7. The method of claim 1 wherein the substrate material is selected from the group consisting of polyethylene and polypropylene; and, the coating material is selected from the group consisting of polymers of vinyl chloride, urethane, amides, and vinylidene chloride.

8. The method of claim 1 including between steps (e) and (f) the additional steps of:
   i. passing the laminate through at least one additional circular extrusion die;
   ii. extrusion coating onto the laminate at least one additional layer of thermoplastic material.

9. In the method of claim 1 wherein the laminate consists of a substrate of polyethylene and a coating of ethylene vinyl acetate copolymer having between 3 percent and 28 percent vinyl acetate content by weight and the additional coating material is an amide polymer, the additional step of immediately quenching the resulting three-layer laminate to prevent crystallization of the amide polymer.